US008671678B2

(12) United States Patent
Östlund

(10) Patent No.: US 8,671,678 B2
(45) Date of Patent: Mar. 18, 2014

(54) PHASE CHANGE MATERIAL ENERGY SYSTEM

(75) Inventor: Bengt Östlund, Sollentuna (SE)

(73) Assignee: Exencotech AB, Sollentuna (SE)

( * ) Notice: Subject to any disclaimer, the term of this patent is extended or adjusted under 35 U.S.C. 154(b) by 307 days.

(21) Appl. No.: 13/054,068

(22) PCT Filed: Jul. 16, 2008

(86) PCT No.: PCT/SE2008/050875
§ 371 (c)(1),
(2), (4) Date: Jan. 13, 2011

(87) PCT Pub. No.: WO2010/008330
PCT Pub. Date: Jan. 21, 2010

(65) Prior Publication Data
US 2011/0120131 A1     May 26, 2011

(51) Int. Cl.
    *F01B 29/08* (2006.01)
(52) U.S. Cl.
    USPC ............................. 60/527; 60/530
(58) Field of Classification Search
    USPC ..................... 60/527, 530
    See application file for complete search history.

(56) References Cited

U.S. PATENT DOCUMENTS

| 3,805,528 | A | * | 4/1974 | Huebscher | 60/530 |
| 3,839,863 | A | * | 10/1974 | Frazier | 60/327 |
| 4,079,596 | A | * | 3/1978 | Cheng et al. | 62/467 |
| 4,186,558 | A | * | 2/1980 | Kuo | 60/527 |
| 4,341,072 | A | * | 7/1982 | Clyne | 60/325 |
| 4,375,152 | A | * | 3/1983 | Barto | 60/530 |
| 4,441,318 | A | * | 4/1984 | Theckston | 60/527 |
| 4,458,488 | A | * | 7/1984 | Negishi | 60/517 |
| 5,025,627 | A | * | 6/1991 | Schneider | 60/527 |
| 5,079,920 | A | * | 1/1992 | Whitehead et al. | 60/527 |
| 5,177,969 | A | * | 1/1993 | Schneider | 60/527 |
| 5,222,362 | A | * | 6/1993 | Maus et al. | 60/527 |

(Continued)

FOREIGN PATENT DOCUMENTS

| DE | 3526289 | 4/1986 |
| DE | 3638739 | 6/1988 |
| DE | 102005039270 | 4/2006 |
| WO | WO 9416368 | 7/1994 |

OTHER PUBLICATIONS

International Preliminary Report on Patentability/Written Opinion of the International Searching Authority for corresponding International Application No. PCT/SE2008/050875, mailed Mar. 19, 2009.

(Continued)

*Primary Examiner* — Thomas Denion
*Assistant Examiner* — Steven D Shipe
(74) *Attorney, Agent, or Firm* — Nixon & Vanderhye PC

(57) ABSTRACT

The present invention relates to an energy system (100) operable to generate mechanical energy. The energy system (100) comprises a cluster of elongated energy cells (10). The energy cells (10) are arranged parallel to each other in their longitudinal direction in a cylinder block means (102). Each energy cell (10) is operable to generate mechanical energy when a phase change material (PCM) changes from solid phase to liquid phase. The energy system (100) also comprises a cylinder head means (104), and a cylinder bottom means (106), both connected to the cylinder block means (102). In FIG. 1, the energy system (100) is partly shown dismantled.

12 Claims, 6 Drawing Sheets

(56) References Cited

U.S. PATENT DOCUMENTS

| | | | | |
|---|---|---|---|---|
| 5,447,195 A | * | 9/1995 | Luyts | 165/159 |
| 5,720,169 A | * | 2/1998 | Schneider | 60/530 |
| 5,738,658 A | * | 4/1998 | Maus et al. | 604/151 |
| 5,899,067 A | * | 5/1999 | Hageman | 60/516 |
| 5,916,140 A | * | 6/1999 | Hageman | 60/525 |
| 2011/0024075 A1 | * | 2/2011 | Ostlund | 165/10 |
| 2011/0120131 A1 | * | 5/2011 | Ostlund | 60/670 |
| 2011/0252783 A1 | * | 10/2011 | Ingvast | 60/527 |

OTHER PUBLICATIONS

International Search Report for PCT/SE2008/050875, mailed Mar. 19, 2009.

* cited by examiner

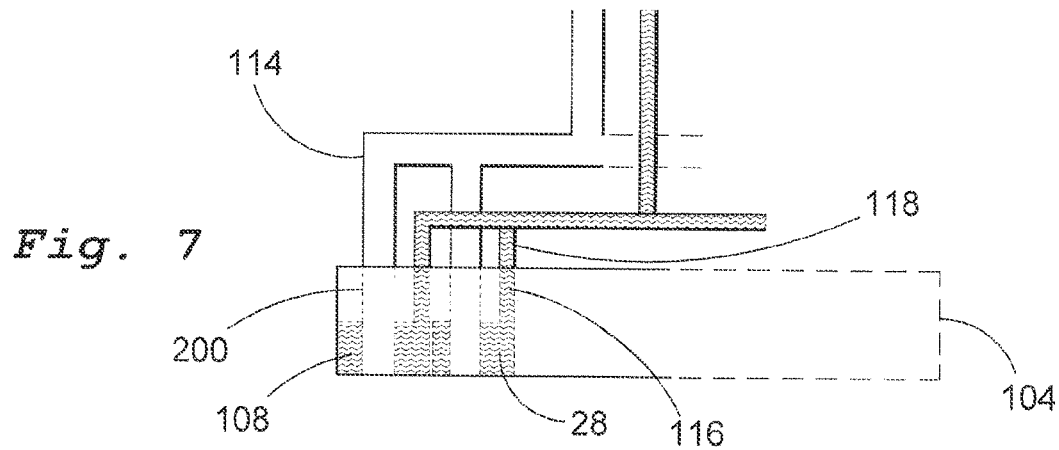
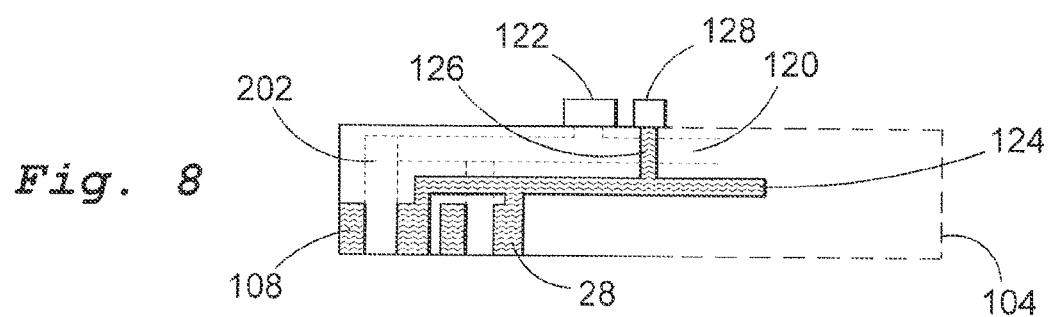
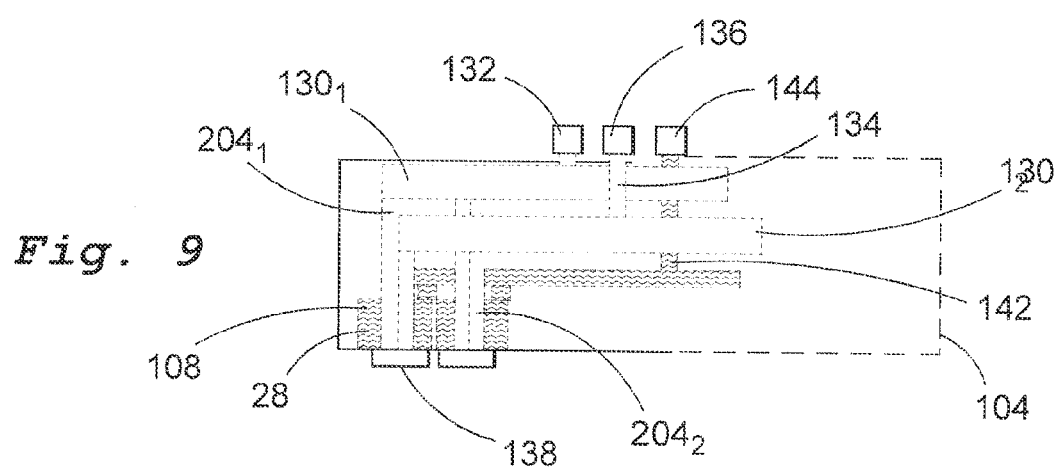

PHASE CHANGE MATERIAL ENERGY SYSTEM

This application is the U.S. national phase of International Application No. PCT/SE2008/050875, filed 16 Jul. 2008, which designated the U.S., the entire contents of which is hereby incorporated by reference.

FIELD OF THE INVENTION

The present invention relates to an energy system operable to generate mechanical energy.

BACKGROUND OF THE INVENTION

The patent document DE 3638739 A1 relates to a thermal adjusting drive comprising a pressure chamber with an adjusting piston and containing a medium expanding when heated, together with a heat source. Foam-forming liquid is contained in the chamber, pressure being generated by a gas soluble in it.

Silicone oil mixed with a wetting agent can be used as the liquid, and pressure can be generated by a founded hydrocarbon, while the heat source can be electric.

The patent document DE 102005039270 A1 relates to a device to transform heat energy into mechanical energy. Expanded through applied heat, expanding bodies are interconnected as desired in a cascade or in parallel. Lengthening produced through heat and shortening produced by cooling is made useable at the end of the expanding bodies in the form of energy. Linked to the expanding bodies output, a cylinder piston system reduces overall strokes. A mixing/heat exchanger device optimizes the use of heat.

The patent document DE 3526289 A1 relates to mechanical power production, e. g. to drive a pump by alternately heating and cooling e. g. oil in pressure vessel containing thin tube bundle heated and cooled to drive piston.

The patent document U.S. Pat. No. 4,079,596 relates to heat engines and heat pumps. FIGS. 6-a and 6-b respectively illustrates a longitudinal cross-section and a transverse cross-section of a stationary type new heat engine. It comprises a multivoid metal block and heaters with manifold means at each end. The multivoid contains a first set of conduits and a second set of conduits. The first set of conduits is used to contain an S/L type working medium and a heating medium, intermediate heat exchange mediums and a cooling medium are to pass through the second set of conduits to cause the working medium to undergo the four steps, viz. A-B, B-C, CD and D-A, described.

A main disadvantage with the above described solutions is that the power density (output power per system weight and/or volume) and the manufacturing cost are not optimized.

SUMMARY OF THE INVENTION

The above mentioned problems are solved by an energy system operable to generate mechanical energy according to claim 1. The energy system comprises a cluster of elongated energy cells. The energy cells are arranged parallel to each other in their longitudinal direction in a cylinder block means in such a way as to optimize the volume of the cylinder block. Each energy cell is operable to generate mechanical energy when a phase change material (PCM) changes from solid phase to liquid phase. The energy cell comprises a housing means holding the phase change material (PCM), an insulating means arranged between the housing means, and the phase change material (PCM), and a heat exchanging means encompassed by the phase change material (PCM), and comprising heat transfer media. The heat exchanging means has an inner surface provided with a number of inner flanges, and an outer surface provided with a number of outer flanges. The inner flanges are encompassed by the heat transfer media. The outer flanges are encompassed by the phase change material (PCM). The energy cell also comprises a movable means arranged in connection to, and being affected by the phase change material (PCM). The energy system also comprises a cylinder head means, and a cylinder bottom means. The cylinder head means is connected to the cylinder block means, and comprises space means arranged in connection to the movable means for each energy cell, and comprising a working fluid contained in connection to, and being affected by the movable means. The cylinder bottom means is connected to the cylinder block means opposite to the cylinder head means, and comprising means operable to transport the heat transfer media.

A main advantage with the energy system according to the present invention is that both the power density and the manufacturing cost are improved. Furthermore, even the efficiency is improved.

A further advantage in this context is achieved if the means each is a first tubular means for each energy cell, and if the cylinder head means also comprises a second tubular means for each energy cell, wherein each first and second tubular means are arranged in relation to the energy cell in such a way that the heat transfer media flows through the first tubular means, the heat exchanging means, and the second tubular means, or vice versa.

According to another embodiment, it is an advantage if the means each is a tubular means divided with a partitioning means into a first means, and a second means for each energy cell, wherein the first and second means are arranged in connection with the cylinder bottom means in such a way that the heat transfer media flows through the first means, forth and back through the heat exchanging means, and the second means.

Furthermore, it is an advantage in this context if the second tubular means is comprised in and/or connected to a second grommet means each connected to a second pipe means outside the cylinder head means, and if the cylinder head means also comprises a first grommet means for each energy cell and connected to the space means, wherein each first grommet means is connected to a first pipe means outside the cylinder head means.

According to another embodiment, it is an advantage if the second tubular means is comprised in and/or connected to a second duct means in turn connected to a first connector means outside the cylinder head means, and if the cylinder head means also comprises a first duct means connected to the space means, and to a common duct means in turn connected to a second connector means outside the cylinder head means.

A further advantage in this context is achieved if the energy system also comprises valve means located outside the cylinder head means both for the heat transfer media, and the working fluid.

According to another embodiment, it is an advantage if the cylinder head means also comprises a first container means for hot heat transfer media, and a second container means for cold heat transfer media, wherein each second tubular means is connected to a valve means integrated in the cylinder head means, wherein each second tubular means after the valve means is connected to a first duct means connected to the first container means and to a second duct means connected to the second container means, wherein the first container means is connected to a first connector means, and the second container means is connected, via a first duct means, to a second connector means, wherein each valve means is located in connection to an energy cell, and if the cylinder head means also comprises a second duct means connected to the space means, and to a common duct means in turn connected to a third connector means, wherein the first to third connector means are located outside the cylinder head means.

Furthermore, it is an advantage in this context if the cylinder bottom means comprises a grommet means for each first tubular means.

According to another embodiment, it is an advantage if the cylinder head means also comprises a first pipe means for each energy cell connected to the space means, and if the energy system also comprises a second pipe means connected to each first pipe means and located outside the cylinder head means.

According to a further embodiment, it is an advantage if the cylinder head means also comprises a first duct means connected to the space means, and to a common duct means in turn connected to a first connector means outside the cylinder head means.

A further advantage in this context is achieved if each first and second tubular means is comprised in and/or connected to a first and second grommet means connected to a first and second pipe means located outside the cylinder bottom means.

According to another embodiment, it is an advantage if each first and second tubular means is comprised in and/or connected to a first and second duct means, wherein each first duct means is connected to a first common duct means in turn connected to a first connector means located outside the cylinder bottom means, and wherein each second duct means is connected to a second common duct means in turn connected to a second connector means located outside the cylinder bottom means.

Furthermore, it is an advantage in this context if the energy system also comprises valve means located outside the cylinder bottom means for the heat transfer media.

According to another embodiment, it is an advantage if the cylinder bottom means also comprises a first container means, and a second container means, wherein each first and second means is connected to a valve means integrated in the cylinder bottom means, wherein each first means after the valve means is connected to a first duct means connected to the first container means, and each second means after the valve means is connected to a second duct means connected to the second container means, wherein the first container means is connected to a first connector means, and the second container means is connected, via a first duct means to a second connector means, wherein the valve means is located in connection to the energy cell, and being operable to switch between hot and cold heat transfer media, It will be noted that the term "comprises/comprising" as used in this description is intended to denote the presence of a given characteristic, step or component, without excluding the presence of one or more other characteristic features, integers, steps, components or groups thereof.

Embodiments of the invention will now be described with a reference to the accompanying drawings, in which:

BRIEF DESCRIPTION OF THE DRAWINGS

FIG. 7 is a sectional view of a first embodiment of the cylinder head means comprised in the energy system disclosed in FIG. 5;

FIG. 8 is a sectional view of a second embodiment of the cylinder head means comprised in the energy system disclosed in FIG. 5;

FIG. 9 is a sectional view of a third embodiment of the cylinder head means comprised in the energy system disclosed in FIG. 5;

DETAILED DESCRIPTION OF PREFERRED EMBODIMENTS

Figure 1:
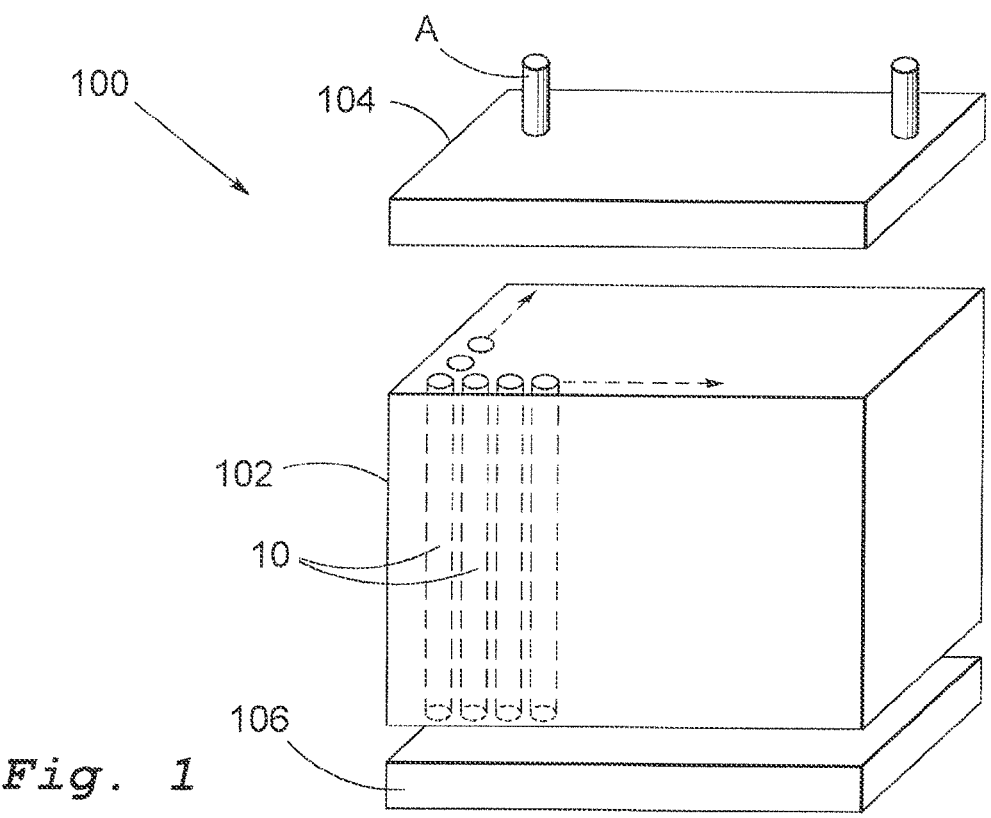
FIG. 1 is a perspective view of an energy system, partly dismantled, operable to generate mechanical energy according to the present invention.

In FIG. 1 there is disclosed a perspective view of an energy system 100, partly dismantled, according to the present invention. The energy system 100 is operable to generate mechanical energy. The energy system 100 comprises a cluster of elongated energy cells 10. The energy cells 10 are arranged parallel to each other in their longitudinal direction in a cylinder block means 102. As is apparent in FIG. 1, not all energy cells 10 are disclosed. The energy system 100 also comprises a cylinder head means 104, and a cylinder bottom means 106. Although not disclosed in FIG. 1, both the cylinder head means 104, and the cylinder bottom means 106 are connected to the cylinder block means 102, but on opposite sides of the cylinder block means 102.

Figure 2:
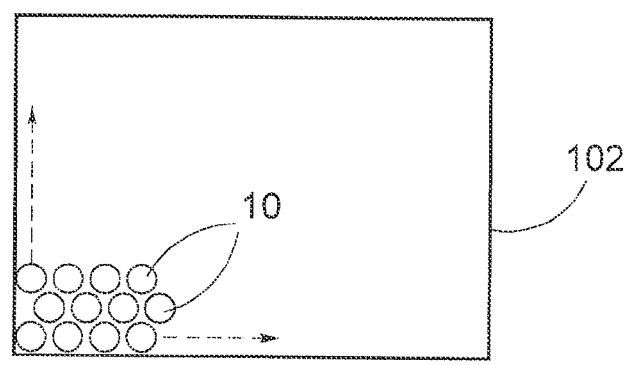
FIG. 2 is a schematically view of the cylinder block means with the energy cells according to the present invention.

In FIG. 2 there is disclosed a schematically view of the cylinder block means 102 comprised in the energy system 100 according to the present invention. In the cylinder block means 102 there is a cluster of energy cells 10. As is disclosed in FIG. 2, the energy cells 10 are arranged parallel to each other in order to optimize the volume of the cylinder block means 102, i. e. to use the volume of the cylinder block means in an optimized way.

Figure 3:
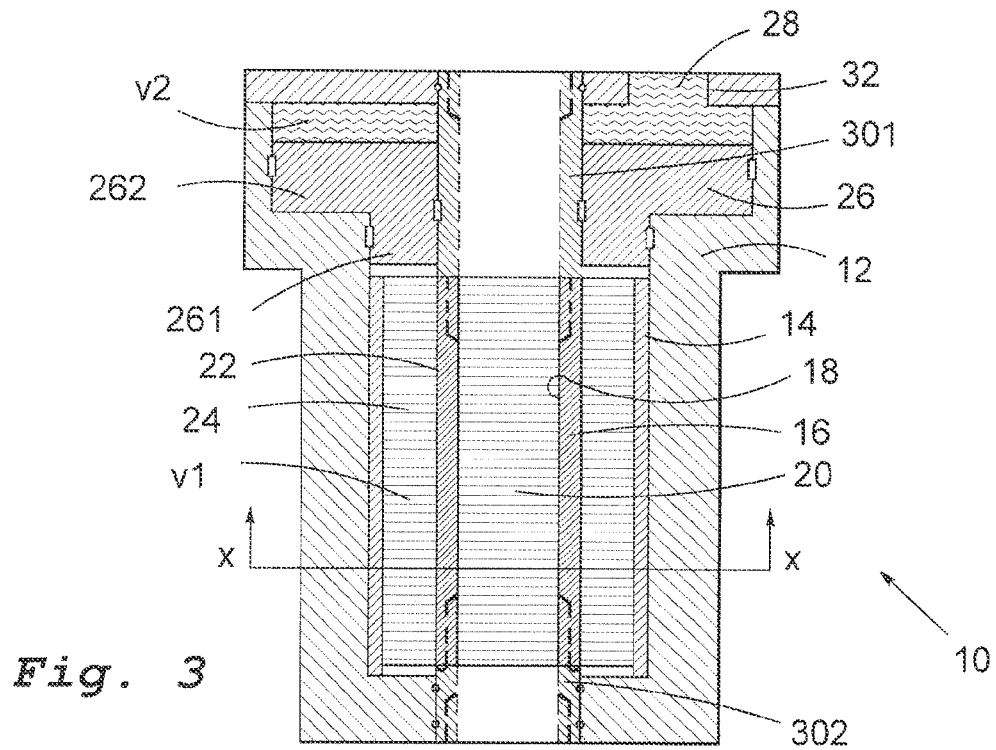
FIG. 3 is a sectional view of a first embodiment of an energy cell comprised in the energy system.

In FIG. 3 there is disclosed a sectional view of a first embodiment of an energy cell 10 operable to generate mechanical energy when a phase change material (PCM) changes from solid phase to liquid phase. The energy cell 10 comprises a housing means 12 holding the phase change material (PCM). The energy cell 10 also comprises an insulating means 14 arranged between the housing means 12, and the phase change material (PCM). The volume v1 is filled with the phase change material (PCM). Furthermore, the energy cell 10 also comprises a heat exchanging means 16 encompassed by the phase change material (PCM), and comprising a heat transfer media. The heat exchanging means 16 has an inner surface 18 provided with a number of inner flanges 20, and an outer surface 22 provided with a number of outer flanges 24. The inner flanges 20 are encompassed by the heat transfer media, and the outer flanges 24 are encompassed by the phase change material (PCM). The energy cell 10 also comprises a movable means 26, in this particular embodiment, a piston means 26 arranged in connection to, and being affected by the phase change material (PCM).

Furthermore, the energy cell 10 also comprises a first, insulating bushing means 301, and a second, insulating bushing means 302.

In the energy cell 10 disclosed in FIG. 3, the piston means 26 has a first part 261, and a second part 262, In a plane perpendicular to the direction of motion of the piston means 26, the first part 261 has a first diameter d1, and the second part 262 has a diameter d2, wherein d2≥d1.

The energy cell 10 also comprises a working fluid 28 which is contained in connection to, and being affected by the second part 262 of the piston means 26. Furthermore, the working fluid 28 can flow out, or in through a connector means 32.

Figure 4:
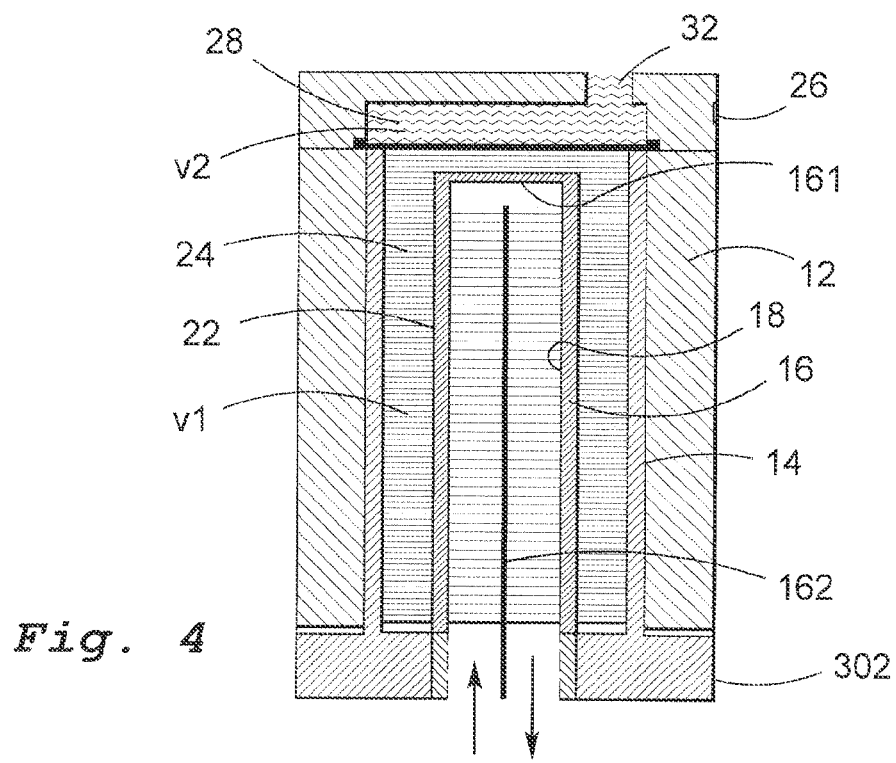
FIG. 4 is a sectional view of a second embodiment of an energy cell comprised in the energy system.

In FIG. 4 there is disclosed a sectional view of a second embodiment of an energy cell 10 comprised in the energy system 100. Similar elements in FIGS. 3 and 4 have been denoted with the same reference signs and will not be described in detail again. In this particular embodiment, the movable means 26 is a membrane means 26. Furthermore, the heat exchanging means 16 is provided with an end means 161 closing the heat exchanging means 16 in such a way that there is a distance between the membrane means 26 and the end means 161 in a plane parallel to the main direction of motion of the membrane means 26. This means that the phase change material (PCM) exists between the end means 161 and the membrane means 26. The heat exchanging means 16 is also provided with a partitioning means 162 in principle, but not completely dividing the tubular heat exchanging means 16 into two connected half tubes. The partitioning means 162 is not connected to the end means 161. This allows the heat transfer media to pass between the partitioning means 162 and the end means 161. The direction of flow of the heat transfer media is indicated with the arrows disclosed in FIG. 4.

Figure 5:
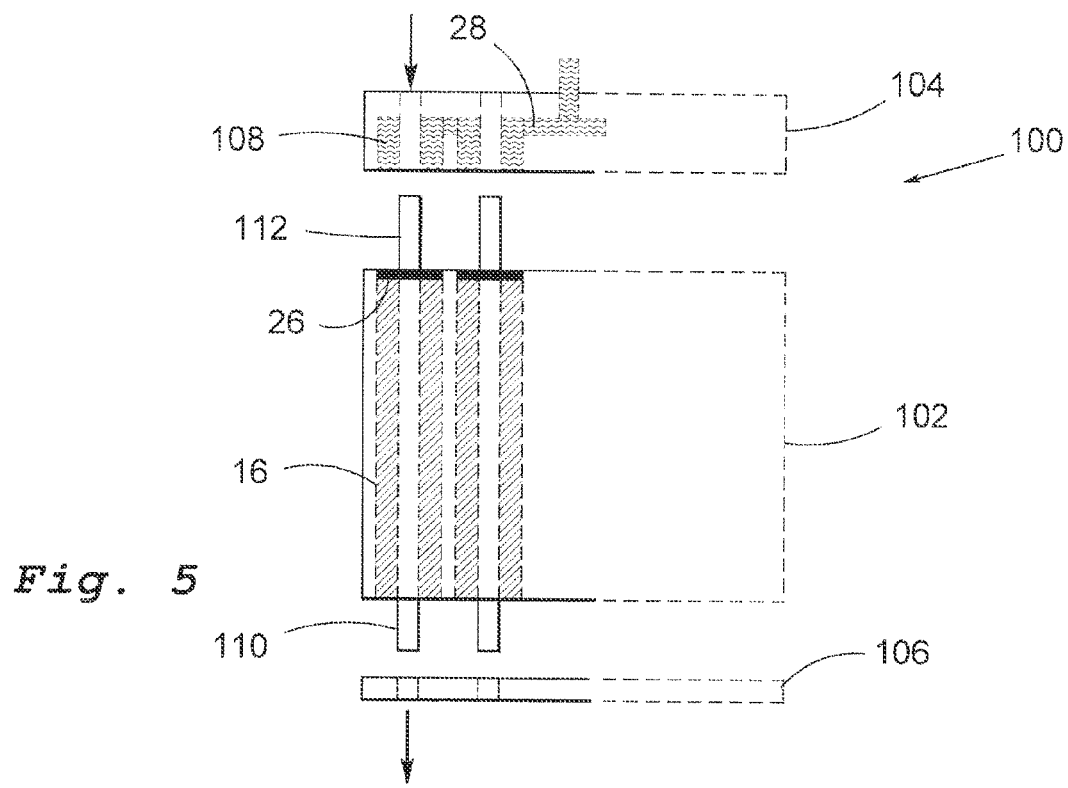
FIG. 5 is a sectional view of a first embodiment of the energy system according to the present invention.

In FIG. 5 there is disclosed a sectional view of a first embodiment of the energy system 100 according to the present invention. As is apparent in FIG. 5, the energy system 100 comprises, as mentioned before, a cylinder block means 102 comprising a duster of energy cells, here illustrated with the heat exchanging means 16. Illustrated here is also the movable means 26, of which there is one for each energy cell. Furthermore, the energy system 100 also comprises a cylinder head means 104, and a cylinder bottom means 106, both of which are connected to the cylinder block means 102. The energy system 100 also comprises a first tubular means 110, and a second tubular means 112 for each energy cell 10. This means that the heat transfer media flows, as indicated with the arrows, through the first tubular means 110, the heat exchanging means 16, and the second tubular means 112, or vice versa. Furthermore, the cylinder head means 104 comprises space means 108 arranged in connection to the movable means 26 for each energy cell 10. The space means 108 comprises a working fluid 28 contained in connection to, and being affected by the movable means 26.

Figure 6:
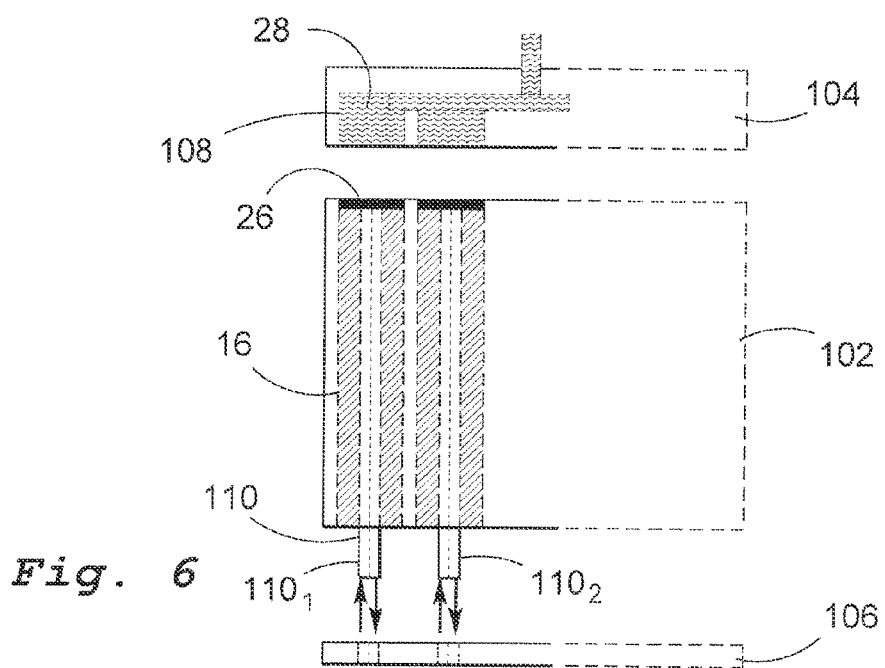
FIG. 6 is a sectional view of a second embodiment of the energy system according to the present invention.

In FIG. 6 there is disclosed a sectional view of a second embodiment of the energy system 100 according to the present invention, Also in this embodiment, the energy system 100 comprises a cylinder block means 102, comprising a cluster of energy cells 10, a cylinder head means 104, and a cylinder bottom means 106. The cylinder head means 104 also comprises space means 108 containing working fluid 28. This energy system 100 comprises a tubular means 110 divided with a partitioning means into a first means $110_1$, and a second means $110_2$ for each energy cell 10. As is apparent in FIG. 6, the first and second means $110_1$, $110_2$ are arranged in connection to the cylinder bottom means 106. This means that the heat transfer media flows through the first means $110_1$, forth and back through the heat exchanging means 16, and the second means $110_2$, as indicated with the arrows.

In FIG. 7 there is disclosed a sectional view of a first embodiment of a cylinder head means 104 comprised in the energy system 100 disclosed in FIG. 5. As indicated before, the cylinder head means 104 comprises space means 108 containing working fluid 28. The second tubular means 112 is comprised in and/or connected to a second grommet means 200 each connected to a second pipe means 114 located outside the cylinder head means 104. The cylinder head means 104 also comprises a first grommet means 116 for each energy cell 10. The first grommet means 116 is connected to the space means 108, and to a first pipe means 118 located outside the cylinder head means 104.

In FIG. 8 there is disclosed a sectional view of a second embodiment of a cylinder head means 104 comprised in the energy system 100 disclosed in FIG. 5. As indicated before, the cylinder head means 104 comprises space means 108 containing working fluid 28. The second tubular means 112 is comprised in and/or connected to a second duct means 202 each connected to a common duct means 120 in turn connected to a first connector means 122 located outside the cylinder head means 104. Furthermore, the cylinder head means 104 also comprises a first duct means 124 connected to the space means 108, and to a common duct means 126 in turn connected to a second connector means 128 located outside the cylinder head means 104.

In FIG. 9 there is disclosed a sectional view of a third embodiment of a cylinder head means 104 comprised in the energy system 100 disclosed in FIG. 5. As indicated before, the cylinder head means 104 comprises space means 108 containing working fluid 28. In this embodiment, the cylinder head means 104 comprises a first container means $130_1$ for hot heat transfer media, and a second container means $130_2$ for cold heat transfer media. Each second tubular means 112 is connected to a valve means 138 integrated in the cylinder head means 104. After the valve means 138, the second tubular means 112 is connected to a first duct means $204_1$ connected to the first container means $130_1$, and to a second duct means $204_2$ connected to the second container means $130_2$. As is apparent in FIG. 9, the first container means $130_1$ is connected to a first connector means 132, and the second container means $130_2$ is connected, via a first duct means 134, to a second connector means 136. The cylinder head means 104 also comprises a second duct means 140 connected to the space means 108, and to a common duct means 142 in turn connected to a third connector means 144. All the connector means 132, 136 and 144 are located outside the cylinder head means 104. Furthermore, each valve means 138 is located in connection to an energy cell 10, and being operable to switch between hot and cold heat transfer media.

Figure 10:
FIG. 10 is a sectional view of the cylinder bottom means comprised in the energy system disclosed in FIG. 5.

In FIG. 10 there is disclosed a sectional view of a cylinder bottom means 106 comprised in the energy system 100 disclosed in FIG. 5. The cylinder bottom means 106 comprises a grommet means 146 for each first tubular means 110.

Figure 11:
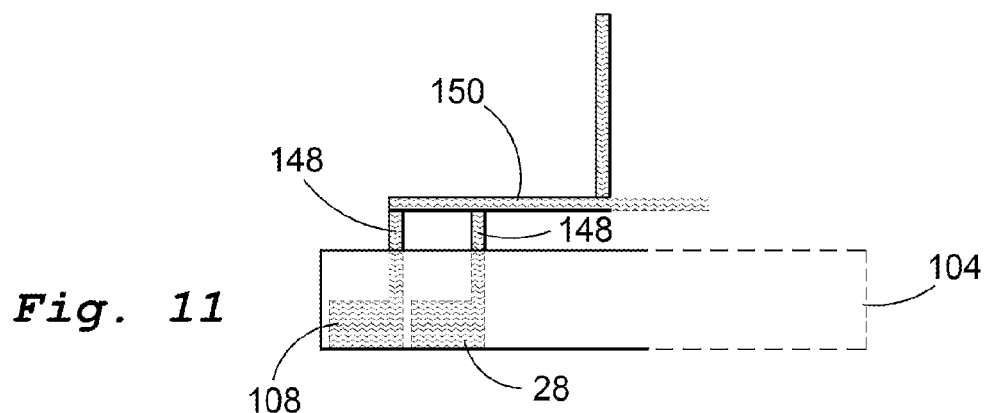
FIG. 11 is a sectional view of a first embodiment of the cylinder head means comprised in the energy system disclosed in FIG. 6.

In FIG. 11 there is disclosed a sectional view of a first embodiment of a cylinder head means 104 comprised in the energy system 100 disclosed in FIG. 6. As indicated before, the cylinder head means 104 comprises space means 108 containing the working fluid 28. The cylinder head means 104 comprises a first pipe means 148 for each energy cell 10 connected to the space means 108. Furthermore, the energy system 100 also comprises a second pipe means 150 connected to each first pipe means 148, and being located outside the cylinder head means 104.

Figure 12:
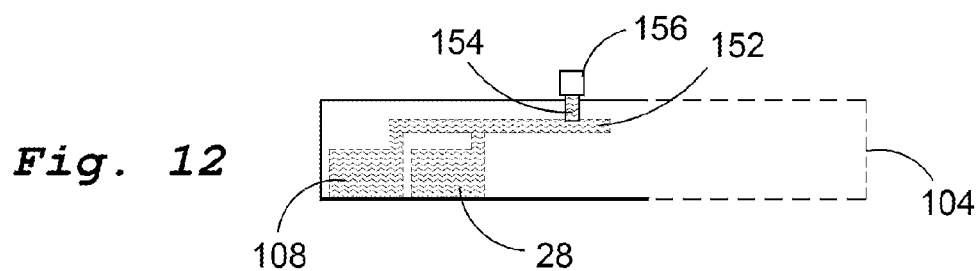
FIG. 12 is a sectional view of a second embodiment of the cylinder head means comprised in the energy system disclosed in FIG. 6.

In FIG. 12 there is disclosed a sectional view of a second embodiment of a to cylinder head means 104 comprised in the energy system 100 disclosed in FIG. 6. Also in this embodiment, the cylinder head means 104 comprises space means 108 containing the working fluid 28. The cylinder head means 104 comprises a first duct means 152 connected to the space means 108, and to a common duct means 154 in turn connected to a first connector means 156 located outside the cylinder head means 104.

Figure 13:
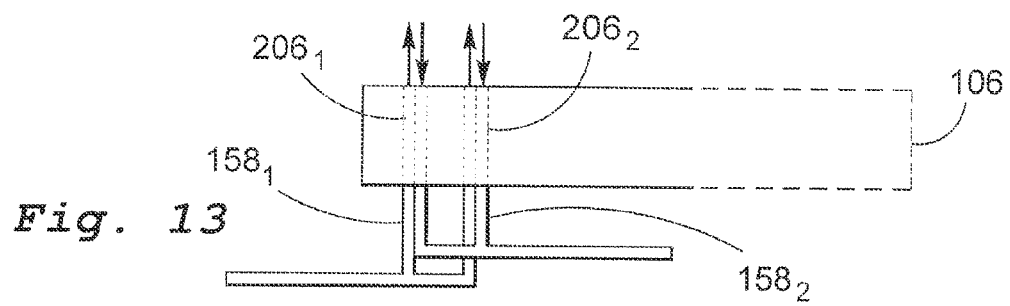
FIG. 13 is a sectional view of a first embodiment of the cylinder bottom means comprised in the energy system disclosed in FIG. 6.

In FIG. 13 there is disclosed a sectional view of a first embodiment of a cylinder bottom means 106 comprised in the energy system disclosed in FIG. 6. In this embodiment, the first and second means $110_1$, $110_2$ each is comprised in and/or connected to a first and second grommet means $206_1$, $206_2$ connected to a first and second pipe means $158_1$, $158_2$ located outside the cylinder bottom means 106.

Figure 14:
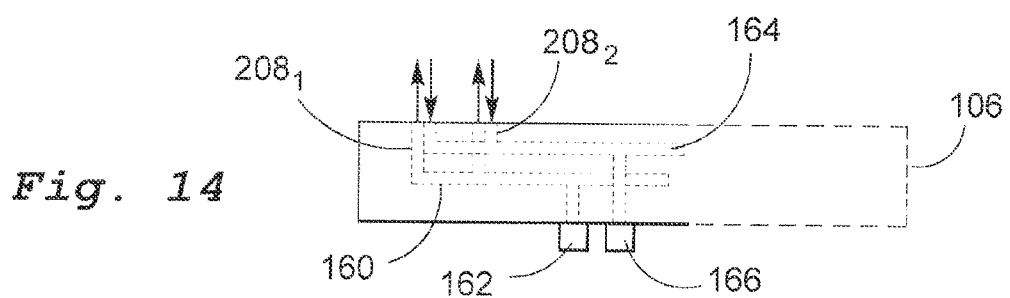
FIG. 14 is a sectional view of a second embodiment of the cylinder bottom means comprised in the energy system disclosed in FIG. 6.

In FIG. 14 there is disclosed a sectional view of a second embodiment of a cylinder bottom means 106 comprised in the energy system 100 disclosed in FIG. 6. Each first and second means $110_1$, $110_2$ is comprised in and/or connected to a first and second duct means $208_1$, $208_2$. Each first duct means $208_1$ is connected to a first common duct means 160 in turn connected to a first connector means 162 located outside the cylinder bottom means 106. Each second duct means $208_2$ is connected to a second common duct means 164 in turn connected to a second connector means 166 located outside the cylinder bottom means 106.

In the embodiments disclosed in FIGS. 13 and 14, the energy system 100 also comprises valve means for the heat transfer media. The valve means are located outside the cylinder bottom means 106.

Figure 15:
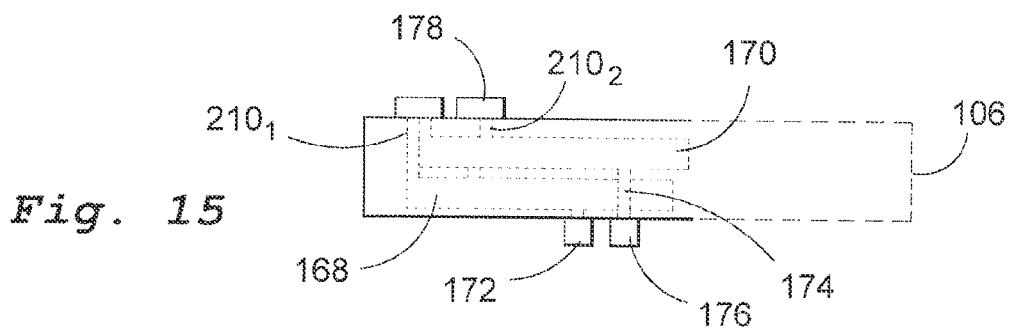
FIG. 15 is a sectional view of a third embodiment of the cylinder bottom means comprised in the energy system disclosed in FIG. 6.

In FIG. 15 there is disclosed a sectional view of a third embodiment of a cylinder bottom means 106 comprised in the energy system 100 disclosed in FIG. 6. The cylinder bottom means 106 comprises a first container means 168, and a second container means 170. Each first and second means $110_1$, $110_2$ is connected to a valve means 178 integrated in the cylinder bottom means 106. After the valve means 178 each first means $110_1$ is connected to a first duct means $210_1$ in turn connected to the first container means 168. After the valve means 178 each second means $110_2$ is connected to a second duct means $210_2$ connected to the second container means 170. The first container means 168 is connected to a first connector means 172, and the second container means 170 is connected, via a first duct means 174, to a second connector means 176. Each valve means 178 is located in connection to an energy cell 10, and being operable to switch between hot and cold heat transfer media.

It is pointed out that the working fluid 28 could e. g. be water or hydraulic oil.

The placing of the valve means close to the energy cells 10 leads to fast switching and low energy losses by less inactive heat transfer media.

The energy system 100 according to the present invention function in the following way, divided in a heating phase, and a cooling phase.

During the heating phase, heat transfer media with a high temperature flows via the inlet pipe through the heat exchanging means 16. The phase change material (PCM) changes phase from solid to liquid and expands under high pressure. The expanding phase change material (PCM) pushes the membrane or piston means 26 upwards and working fluid 28 (e. g. water or hydraulic oil) flows through the ducts in the cylinder head means 104 to the connector means. A hydraulic device such as a piston or motor is connected to the connector means. If needed a pressure reduction device can be attached between the energy system 100 and the hydraulic device.

During the cooling phase, heat transfer media with low temperature flows via the inlet pipe through the heat exchanging means 16. The phase change material (PCM) changes phase from liquid to solid and contracts under low pressure. The hydraulic pressure and the contracting phase change material (PCM) drags the membrane or piston means 26 downwards and working fluid 28 flows back through the ducts in the cylinder head means 104 to the connector means.

It is pointed out that in all the different embodiments disclosed and described in this application, the movable means 26 can on the one hand be a piston means 26 and on the other hand be a membrane means 26.

The invention is not limited to the embodiments described in the foregoing. It will be obvious that many different modifications are possible within the scope of the following Claims.

The invention claimed is:

1. An energy system operable to generate mechanical energy, said energy system comprising a cluster of elongated energy cells, arranged parallel to each other in their longitudinal direction in a cylinder block in such a way as to optimize the volume of said cylinder block, each energy cell being operable to generate mechanical energy when a phase change material (PCM) changes from solid phase to liquid phase, said energy cell comprising a housing holding said phase change material (PCM), an insulator arranged between said housing, and said phase change material (PCM), and a heat exchanger encompassed by said phase change material (PCM), and comprising a heat transfer media, said heat exchanger having an inner surface provided with a number of inner flanges, and an outer surface provided with a number of outer flanges, said inner flanges being encompassed by said heat transfer media, and said outer flanges being encompassed by said phase change material (PCM), and said energy cell also comprising a movable member arranged in connection to, and being affected by said phase change material (PCM), said energy system also comprising a cylinder head and a cylinder bottom, said cylinder head being connected to said cylinder block, and comprising a space arranged in connection to said movable member for each energy cell, and comprising a working fluid contained in connection to, and being affected by said movable member, and wherein said cylinder bottom is connected to said cylinder block opposite to said cylinder head, and comprising tubular members operable to transport said heat transfer media, wherein each of said tubular members is a first tubular member for each energy cell, and wherein said cylinder head also comprises a second tubular member for each energy cell each first and second tubular member being arranged in relation to said energy cell in such a way that said heat transfer media flows through said first tubular member to said heat exchanger, and back through said second tubular member, or through said second tubular member to said heat exchanger, and back through said first tubular member, and wherein said cylinder head also comprises a first container for hot transfer media, and a second container for cold heat transfer media, each said second tubular member being connected to a valve integrated in said cylinder head, each said second tubular member after said valve being connected to a first duct connected to said first container and to a second duct connected to said second container, said first container being connected to a first connector, and said second container being connected, via a first duct, to a second connector, each valve being located in connection to an energy cell, and operable to switch between hot and cold heat transfer media, said cylinder head also comprising a second duct connected to said space, and to a common duct, which, in turn, is connected to a third connector, said first to third connectors being located outside said cylinder head.

2. The energy system according to claim 1, wherein each of said tubular members is divided with a partition into a first tubular member and a second tubular member for each energy cell, and wherein said first and second tubular members are arranged in connection with said cylinder bottom in such a way that said heat transfer media flows through said first tubular member, forth and back through said heat exchanger, and said second tubular member.

3. The energy system according to claim 2, wherein said cylinder head also comprises a first pipe for each energy cell connected to said space, said energy system also comprising a second pipe connected to each first pipe and located outside said cylinder head.

4. The energy system according to claim 2, wherein said cylinder head also comprises a first duct connected to said space, and to a common duct, which, in turn, is connected to a first connector outside said cylinder head.

5. The energy system according to claim 2, wherein each said first and second tubular member is comprised in or connected to or comprised in and connected to a first and second grommet connected to a first and second pipe located outside said cylinder bottom.

6. The energy system according to claim 5, wherein said energy system also comprises valves located outside said cylinder bottom for said heat transfer media.

7. The energy system according to claim 2, wherein each said first and second tubular member is comprised in or connected to or comprised in and connected to a first and second duct, each said first duct being connected to a first common duct, which in turn, is connected to a first connector located outside said cylinder bottom, each said second duct being connected to a second common duct, which in turn, is connected to a second connector located outside said cylinder bottom.

8. The energy system according to claim 1, wherein said second tubular member is comprised in or connected to or comprised in and connected to a second grommet, each second grommet being connected to a second pipe outside said cylinder head, said cylinder head also comprising a first grommet for each energy cell and being connected to said space, and wherein each first grommet is connected to a first pipe outside said cylinder head.

9. The energy system according to claim 8, wherein said energy system also comprises valves located outside said cylinder head, both for said heat transfer media, and said working fluid.

10. The energy system according to claim 1, wherein said second tubular member is comprised in or connected to or comprised in and connected to a second duct, each second duct being connected to a common duct, which in turn is connected to a first connector outside said cylinder head, said cylinder head also comprising a first duct connected to said space, and to a common duct, which, in turn, is connected to a second connector outside said cylinder head.

11. The energy system according to claims 1, wherein said cylinder bottom comprises a grommet for each said first tubular member.

12. An energy system operable to generate mechanical energy, said energy system comprising a cluster of elongated energy cells, arranged parallel to each other in their longitudinal direction in a cylinder block in such a way as to optimize the volume of said cylinder block, each energy cell being operable to generate mechanical energy when a phase change material (PCM) changes from solid phase to liquid phase, said energy cell comprising a housing holding said phase change material (PCM), an insulator arranged between said housing and said phase change material (PCM), and a heat exchanger encompassed by said phase change material (PCM), and comprising a heat transfer media, said heat exchanger having an inner surface provided with a number of inner flanges, and an outer surface provided with a number of outer flanges, said inner flanges being encompassed by said heat transfer media, and said outer flanges being encompassed by said phase change material (PCM), and said energy cell also comprising a movable member arranged in connection to, and being affected by said phase change material (PCM), said energy system also comprising a cylinder head and a cylinder bottom, said cylinder head being connected to said cylinder block, and comprising a space arranged in connection to said movable member for each energy cell, and comprising a working fluid contained in connection to, and being affected by said movable member, and wherein said cylinder bottom is connected to said cylinder block opposite to said cylinder head, and comprising tubular members operable to transport said heat transfer media, wherein each of said tubular members is divided with a partition into a first tubular member and a second tubular member for each energy cell, and wherein said first and second heat tubular members are arranged in connection with said cylinder bottom in such a way that said heat transfer media flows through said first tubular member, forth and back through said heat exchanger, and said second tubular member, and wherein said cylinder bottom also comprises a first container, and a second container, each said first and second tubular member being connected to a valve integrated in said cylinder bottom, each said first tubular member after said valve being connected to a first duct connected to said first container, and each said second tubular member after said valve being connected to a second duct connected to said second container, said first container being connected to a first connector, and said second container being connected, via a first duct, to a second connector, said valve being located in connection to said energy cell, and operable to switch between hot and cold heat transfer media.

* * * * *